(12) United States Patent
Fath

(10) Patent No.: US 7,085,644 B2
(45) Date of Patent: Aug. 1, 2006

(54) METHOD FOR MONITORING AN INTERNAL COMBUSTION ENGINE

(75) Inventor: Andreas Fath, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 163 days.

(21) Appl. No.: 10/914,550

(22) Filed: Aug. 9, 2004

(65) Prior Publication Data

US 2005/0015195 A1 Jan. 20, 2005

Related U.S. Application Data

(63) Continuation of application No. PCT/EP03/13379, filed on Nov. 27, 2003.

(30) Foreign Application Priority Data

Dec. 18, 2002 (DE) ............................... 102 59 358

(51) Int. Cl.
*F02D 41/22* (2006.01)
(52) U.S. Cl. ..................... 701/107; 701/114; 701/115
(58) Field of Classification Search ................ 701/107, 701/114, 115, 102
See application file for complete search history.

(56) References Cited

U.S. PATENT DOCUMENTS 4,556,029 A * 12/1985 Yamaguchi et al. ..... 123/41.15
5,377,112 A    12/1994 Brown, Jr. et al. ......... 701/115

FOREIGN PATENT DOCUMENTS

| EP | 0 879 950 A2 | 11/1998 |
| EP | 1 18 761 A2 | 7/2001 |
| JP | 63-268951 A * | 11/1988 |
| JP | 2004-251186 A * | 9/2004 |

OTHER PUBLICATIONS

International PCT Search Report with Notification, PCT/EP03/13379, Apr. 29, 2004.
van Basshuysen, Richard et al., "Internal Combustion Engine Handbook, Basics, Components, Systems and Perspectives", p. 45-46, 2004.

* cited by examiner

*Primary Examiner*—Hieu T. Vo
(74) *Attorney, Agent, or Firm*—Baker Botts L.L.P.

(57) ABSTRACT

A method for monitoring an internal combustion engine (1') having an injection system, in particular for preventing dieseling in the case of a diesel engine, comprising the following steps: Establishing a theoretical calorific balance of the internal combustion engine (1') and determining a diagnostic signal (ΔH) reflecting the disequilibrium of the calorific balance, the diagnostic signal (ΔH) indicating a fault in the injection system and/or the internal combustion engine (1').

12 Claims, 4 Drawing Sheets

METHOD FOR MONITORING AN INTERNAL COMBUSTION ENGINE

CROSS REFERENCE TO RELATED APPLICATION

This application is a continuation of copending International Application No. PCT/EP03/13379 filed Nov. 27, 2003 which designates the United States, and claims priority to German application no. 102 59 358.2 filed Dec. 18, 2002.

TECHNICAL FIELD OF THE INVENTION

The present invention relates to a method for monitoring an internal combustion engine having an injection system.

DESCRIPTION OF THE RELATED ART

In modern diesel engines, common rail injection systems are frequently used whereby all the combustion chambers are supplied with fuel by a common accumulator, the high injection pressure being continuously maintained in the accumulator during operation so that in the event of defective opening of an injector (e.g. due to a valve needle sticking or contamination in the seating area of the valve needle), fuel flows into the associated combustion chamber of the internal combustion engine. A malfunction of this kind can cause so much fuel to enter the combustion chamber that no further combustion or at least vaporization of the outflowing fuel is possible, with the result that the combustion chamber fills with fuel. If the quantity of fuel in a combustion chamber exceeds its clearance volume, this results in so-called dieseling, as the incompressible fuel prevents the piston from reaching top dead center during the compression stroke. The resulting mechanical stresses generally lead to engine damage, so that it is absolutely essential to prevent dieseling.

SUMMARY OF THE INVENTION

The object of the invention is therefore to prevent engine damage that may be caused by a combustion chamber becoming full in an internal combustion engine having an injection system.

This object can be achieved by a method for monitoring an internal combustion engine having an injection system, in particular for preventing dieseling in the case of a diesel engine, comprising the following steps of establishing a theoretical calorific balance of the internal combustion engine, and determining a diagnostic signal reflecting the disequilibrium of the theoretically determined calorific balance, said diagnostic signal indicating a malfunction in the injection system and/or the internal combustion engine.

The invention encompasses the general technical teaching of establishing a calorific balance of the internal combustion engine and generating, as a function of the balance, a diagnostic signal which reflects the operating behavior of the internal combustion engine and/or injection system, thereby enabling dieseling to be prevented.

The invention is based on the knowledge that the theoretically calculated calorific balance of the internal combustion engine is only in equilibrium when the injected fuel is being properly combusted. However, in the event of incomplete combustion of the injected fuel because of a fault in the injection system (e.g. due to the valve needle of an injector sticking in the injection position), the theoretical energy balance of the internal combustion engine is out of equilibrium, thereby enabling the fault to be detected. The diagnostic signal therefore reflects the disequilibrium of the theoretically determined energy balance.

For the inventive establishment of the calorific balance virtually any system limits can be selected. It is possible, for example, for the balance envelope to include the internal combustion engine with all ancillary equipment. Alternatively, however, it is also possible for the balance envelope to encompass the internal combustion engine only, whereas the ancillary equipment is not contained in the balance envelope.

As part of calorific balancing of the internal combustion engine, preferably at least one calorific state variable of the internal combustion engine is determined at the input and output side respectively and taken into account for the balancing.

One of the internal combustion engine's calorific state variables determined at the input side can be, among other things, the enthalpy supplied to the internal combustion engine via the injected fuel.

The enthalpy supplied by the fuel can be calculated from the injection quantity and the specific calorific value of the injected fuel, the injection quantity essentially resulting from the injection duration.

On the other hand, one of the internal combustion engine's calorific state variables determined at the output side is preferably the enthalpy removed via the exhaust gas flow.

This removed enthalpy can be calculated from the mass air flow, the exhaust gas temperature and the injected fuel mass. The exhaust gas temperature is preferably determined by a temperature sensor disposed on the exhaust side, while the mass air flow is preferably measured by a mass air flow meter disposed in the intake region of the internal combustion engine.

Alternatively, however, it is also possible to calculate the enthalpy removed by the exhaust gas flow from the known cubic capacity and RPM of the internal combustion engine. For this purpose the volumetric air flow is first calculated from the capacity and RPM, which then yields the mass air flow if the density is known.

Preferably the mechanical work performed by the internal combustion engine and the thermal losses of the internal combustion engine are also taken into account for calorific balancing of the internal combustion engine.

If the ancillary equipment (e.g. compressor, exhaust gas turbine, intercooler, etc.) are contained in the balance envelope, the thermal losses of the ancillary equipment and the mechanical work performed by the ancillary equipment are preferably also taken into account for calorific balancing.

However, the energy balance theoretically calculated within the scope of the invention only works out exactly if the injected fuel quantity is properly combusted. If, on the other hand, the injected fuel is not completely combusted because of a malfunction (e.g. the valve needle sticking in the injection position), the enthalpy actually supplied is much smaller than the theoretically supplied enthalpy calculated from the injection quantity.

The diagnostic signal determined according to the invention therefore preferably reflects the disturbance in the theoretically calculated energy balance and is therefore a measure for the uncombusted fuel, thereby enabling dieseling to be prevented.

Some internal combustion engines have exhaust gas recirculation whereby part of the internal combustion engine's exhaust gas is fed back to the air intake of the internal combustion engine in accordance with a defined exhaust gas recirculation rate. For internal combustion engines of this kind, the enthalpy contained in the recirculated exhaust gas flow must be taken into account for calorific balancing.

The diagnostic signal determined according to the invention is preferably compared with a limit value in order to enable the disturbance in the theoretical energy balance to be quantified. If the predefined limit value is exceeded, emergency shutdown of the internal combustion engine preferably takes place in order to prevent dieseling.

The diagnostic signal is preferably compared with two different limit values in order to initiate countermeasures adapted to suit the severity of the fault.

If the smaller limit value is exceeded, a warning light is merely activated, whereas if the larger limit value is exceeded, this will result in the emergency shutdown mentioned above.

The invention is not limited to use in a diesel engine. Rather the method according to the invention can also be used in other types of internal combustion engines having an injection system, such as in gasoline engines.

BRIEF DESCRIPTION OF THE DRAWINGS

Other advantageous further developments of the invention are contained in the sub-claims or will now be explained together with the description of the preferred embodiments of the invention with reference to the accompanying drawings in which

DETAILED DESCRIPTION OF THE PREFERRED EMBODIMENTS

Figure 1A:
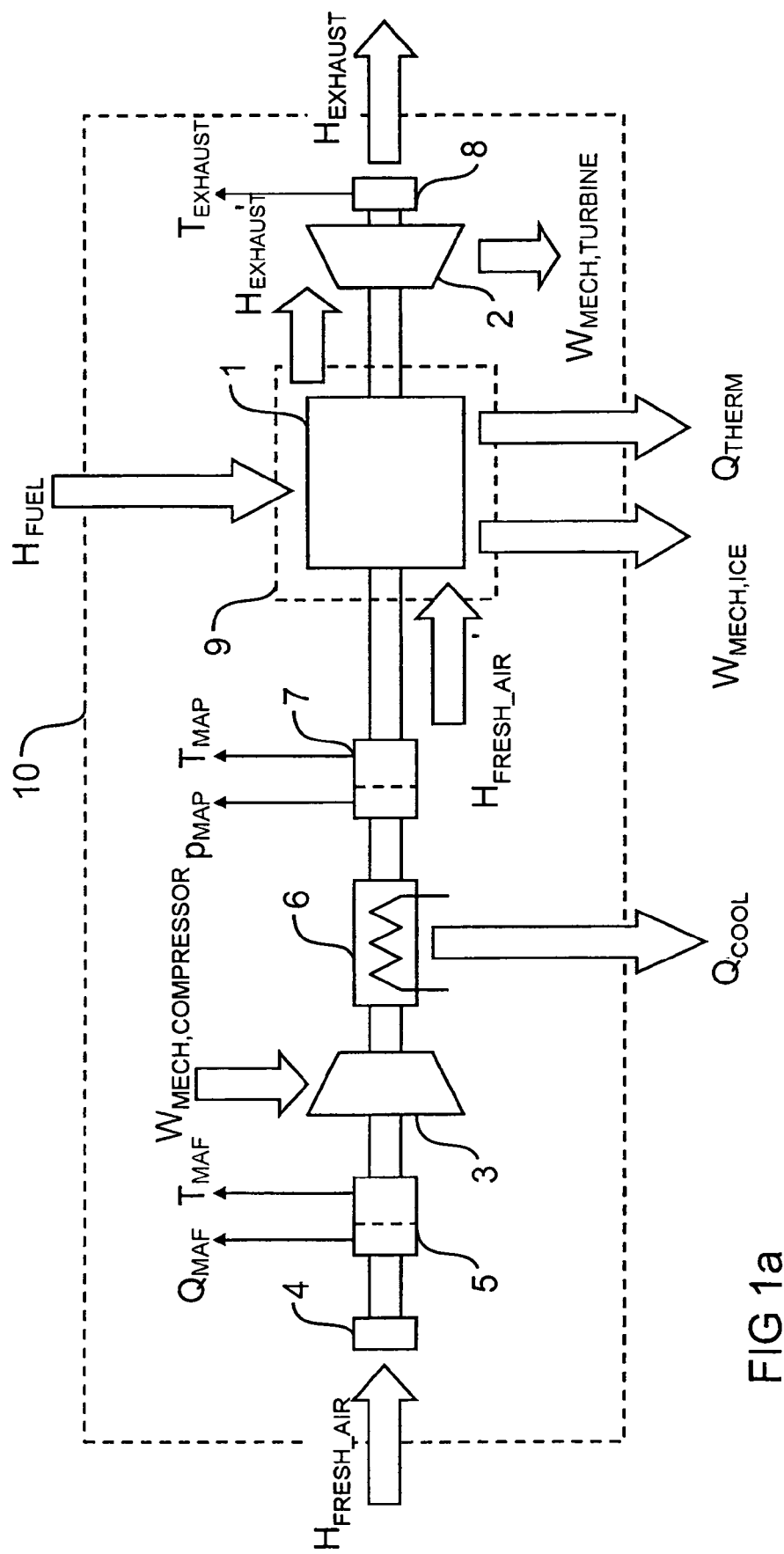
FIG. 1a shows a simple schematic diagram of the energy flows in an internal combustion engine without exhaust gas recirculation, FIG. 1b schematically illustrates the energy flows in an internal combustion engine with exhaust gas recirculation.

The schematic diagram in FIG. 1a shows the layout of a drive system with an internal combustion engine 1 and the energy flows in the drive system, the energy flows being represented as block arrows.

To boost performance, the drive system shown here has an exhaust gas turbocharger basically comprising an exhaust gas turbine 2 disposed in the exhaust gas flow of the internal combustion engine 1, and an air-intake-side compressor 3 driven by the exhaust gas turbine 2.

The compressor 3 sucks in fresh air via an air filter 4, there being disposed between the air filter 4 and the compressor a sensor 5 which measures the temperature $T_{MAF}$ (MAF—Manifold Air Flow) of the intake air and the mass air flow $Q_{MAF}$. Knowledge of these variables is important for calculating the enthalpy $H_{FRESH\_AIR}$ supplied by the intake air, as will be described in detail below.

Downstream of the compressor 3 there is disposed an intercooler 6 which reduces the temperature of the fresh air, thereby removing thermal energy $Q_{COOL}$ from the drive system. This cooling of the fresh air is advisable, as the compressor 3 increases the fresh air temperature and the performance of the internal combustion engine 1 falls as the fresh air temperature increases.

Between the intercooler 6 and the internal combustion engine 1 there is disposed another sensor 7 which measures the fresh air temperature $T_{MAP}$ and the pressure $p_{MAP}$ downstream of the intercooler 6. Knowledge of these variables is important for balancing the energy flows, as will be described in detail below.

Finally the drive system has yet another temperature sensor 8 which is disposed downstream of the exhaust gas turbine 2 and measures the exhaust gas temperature $T_{EXHAUST}$.

For balancing of the energy flows, the balance limit must first be determined, the drawing showing two exemplary balance limits 9, 10. The balance limit 9 encompasses the internal combustion engine 1, while the balance limit 10 includes the entire drive system with the ancillary equipment.

In the following, an energy balance for the outer balance limit 10 will first be drawn up to explain the physical relationships. For a system limit of this kind, energy is supplied to the system via the enthalpy $H_{FRESH\_AIR}$ contained in the fresh air and the enthalpy $H_{FUEL}$ contained in the fuel. On the other hand the system expends energy via the enthalpy $H_{EXHAUST}$ contained in the exhaust gas, the thermal cooling energy $Q_{COOL}$ of the intercooler 6, the mechanical work $W_{MECH,ICE}$ performed by the internal combustion engine, and the thermal losses $Q_{THERM}$ of the internal combustion engine 1. The energy balance for the system limit 9 is therefore given by:

$$H_{FRESH\_AIR}+H_{FUEL}=W_{MECH,ICE}+Q_{COOL}+Q_{THERM}+H_{EXHAUST}.$$

The enthalpy $H_{FRESH\_AIR}$ contained in the intake air can be easily calculated from the mass fresh air flow $Q_{MAF}$, the mass (manifold) fresh air temperature $T_{MAF}$ and the specific heat capacity $c_{AIR}$ of air. Therefore we get:

$$H_{FRESH\_AIR}=f_1(Q_{MAF}, c_{AIR}, T_{MAF})$$

There is further obtained the enthalpy $H_{FUEL}$ supplied via the fuel from the injected fuel quantity $m_{FUEL}$ and the specific calorific value $H_0$ of the fuel, assuming complete combustion of the injected fuel, i.e.:

$$H_{FUEL}=m_{FUEL} \cdot H_0$$

The injected fuel quantity $m_{FUEL}$ can in turn be easily calculated from the injection duration, the injection pressure and the known flow rate HD of the injector under standardized conditions and is therefore known.

There is additionally obtained the mechanical work $W_{MECH,ICE}$ performed by the internal combustion engine 1 as a function of the measured RPM and other known engine parameters from an engine map, i.e.:

$$W_{MECH,TURBINE}=f_2(\text{engine parameters})$$

The thermal losses $Q_{THERM}$ of the internal combustion engine 1 and the cooling energy $Q_{COOL}$ of the intercooler 6 can likewise be easily obtained from an engine map:

$$Q_{COOL}=f_3(\text{engine parameters}).$$

Finally the enthalpy $H_{EXHAUST}$ removed via the exhaust gas can be calculated from the exhaust gas temperature $T_{EXHAUST}$:

$$H_{EXHAUST}=f_4(m_{EXHAUST}, c_{EXHAUST}, T_{EXHAUST}).$$

The exhaust gas quantity $m_{EXHAUST}$ is in turn obtained from the mass fresh air flow $Q_{MAF}$ and the injected fuel mass $m_{FUEL}$, while $c_{EXHAUST}$ is the known specific thermal capacity of the exhaust gas.

In the case of proper combustion of the injected fuel, the above-described energy balance must be in equilibrium. On the other hand, if combustion of the injected fuel is incomplete because of a malfunction (e.g. the valve needle of an injector sticking in the open position) the calculation of the enthalpy $H_{FUEL}$ supplied by the fuel yields incorrect results, so that the above-described computational energy balance is no longer in equilibrium.

An energy balance will now be drawn up for the inner balance limit 9 of the drive system. For a system limit of this kind, energy is supplied to the system via the enthalpy $H_{FRESH\_AIR}'$ contained in the fresh air and the enthalpy $H_{FUEL}$ contained in the fuel. On the other hand the system loses energy through the mechanical work $W_{MECH,ICE}$ performed by the internal combustion engine 1, the thermal losses $Q_{THERM}$ of the internal combustion engine 1, and the enthalpy $H_{EXHAUST}'$ contained in the exhaust gas. Note that the enthalpy $H_{FRESH\_AIR}$ contained in the fresh air upstream of the compressor 3 is not equal to the enthalpy $H_{FRESH\_AIR}'$ of the fresh air downstream of the intercooler 6.

In respect of the system limit 9, the energy balance of the internal combustion engine 1 is therefore given by:

$$H_{FRESH\_AIR}' + H_{FUEL} = H_{EXHAUST}' + W_{MECH,ICE} + Q_{THERM}.$$

The calculation of the variables $H_{FUEL}$, $W_{MECH,ICE}$ and $Q_{THERM}$ has already been explained above, while the enthalpy $H_{FRESH\_AIR}'$ contained in the fresh air immediately preceding the internal combustion engine 1 is calculated as follows:

$$H_{FRESH\_AIR}' = f_6(p_{MAP}, T_{MAP}, c_{AIR}, Q_{MAF}).$$

Finally the enthalpy $H_{EXHAUST}'$ contained in the exhaust gas immediately downstream of the internal combustion engine 1 is calculated as follows:

$$H_{EXHAUST}' = f_7(m_{EXHAUST}, c_{EXHAUST}, T_{EXHAUST}).$$

Also in the case of the balance limit 9, the energy balance is only in equilibrium if the computationally determined enthalpy $H_{FUEL}$ correctly reflects the actual enthalpy value, which is only the case when the injected fuel is properly combusted. On the other hand, if the injected fuel is not properly combusted, the computational enthalpy $H_{FUEL}$ deviates from the actual value, so that the energy balance is no longer in equilibrium.

Figure 2A:
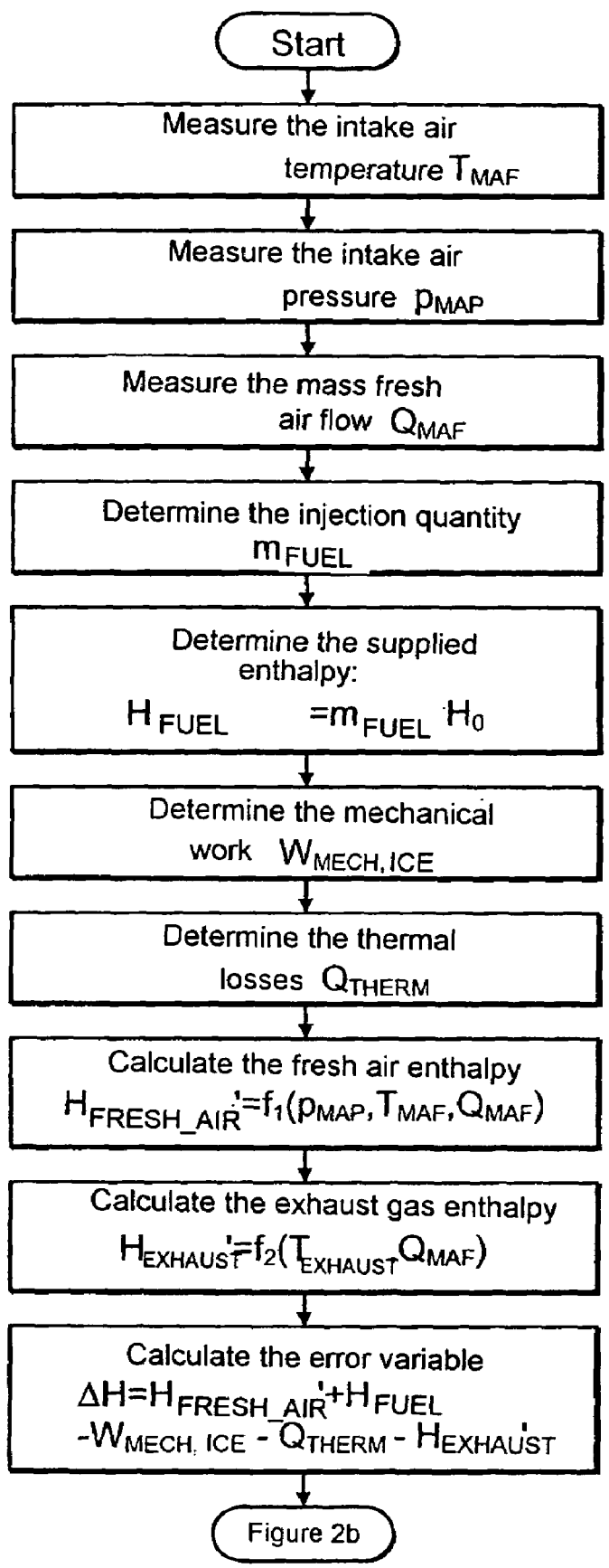
FIGS. 2a and 2b show simplified energy balances of an internal combustion engine to clarify the inventive principle.
Figure 2B:
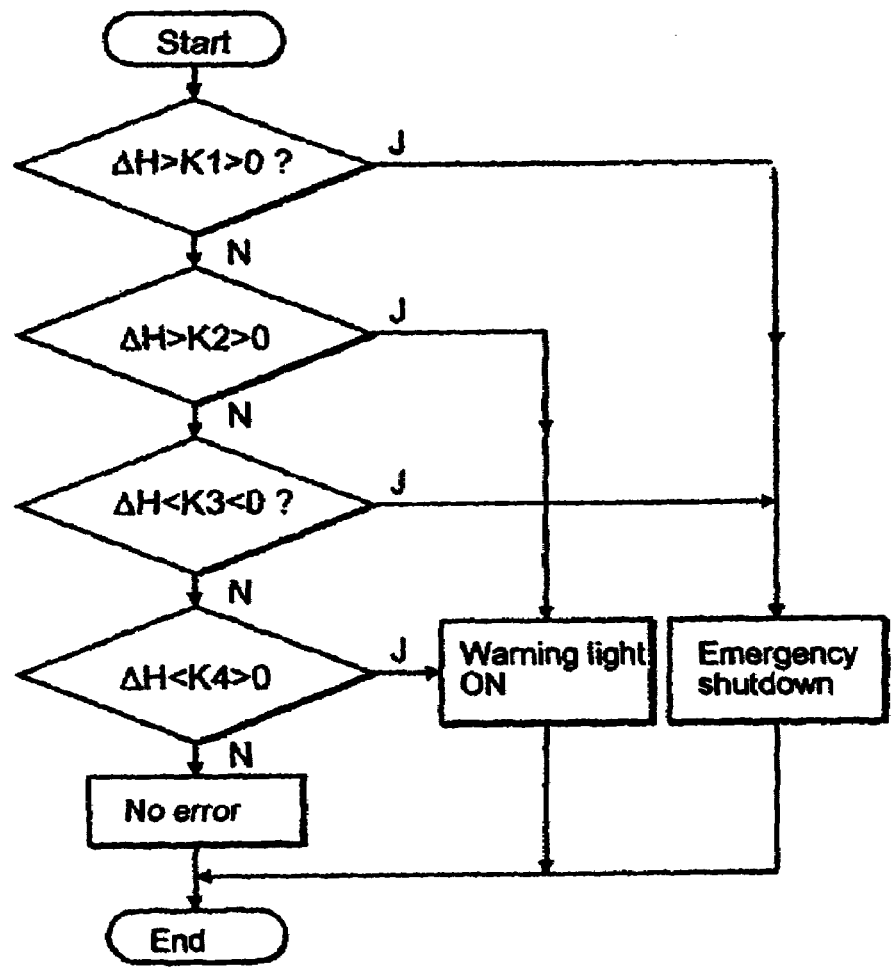

This is utilized by the method according to the invention as shown in FIGS. 2a and 2b in the form of a flow chart.

As part of the method according to the invention, the sensor 5 measures the intake air temperature $T_{MAF}$ and the mass fresh air flow $Q_{MAF}$ preceding the compressor 3.

In addition, the sensor 7 measures the fresh air temperature $T_{MAP}$ and the pressure $p_{MAP}$ after the intercooler 6.

Moreover, the injection quantity $m_{FUEL}$ is read out from the engine control unit, the injection quantity $m_{FUEL}$ resulting from the injection duration and the injection pressure.

The enthalpy $H_{FRESH\_AIR}'$ supplied by the fresh air, the enthalpy $H_{FUEL}$ contained in the fuel, the enthalpy $H_{EXHAUST}'$ contained in the exhaust gas, the thermal losses $Q_{THERM}$ and the mechanical work $W_{MECH,ICE}$ of the internal combustion engine 1 are then calculated from the thus determined variables according to the above-described formulae.

This yields an error variable $$\Delta H = H_{FRESH\_AIR} + H_{FUEL} - W_{MECH,ICE} - Q_{COOL} - Q_{THERM} - H_{EXHAUST}$$

which reflects the disturbance in the theoretically calculated energy balance.

Figure 1B:
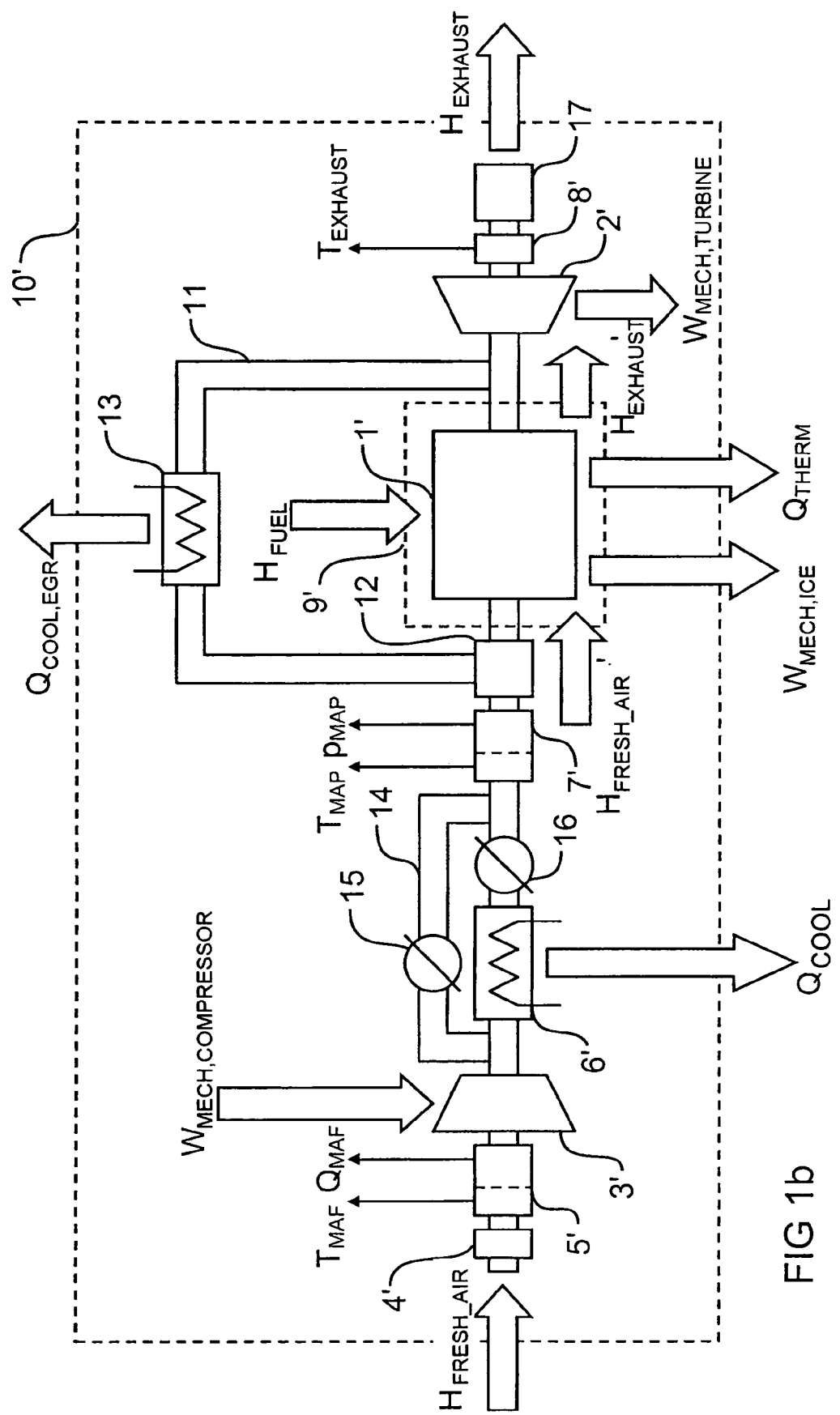

In the method section shown in FIG. 1b, the diagnostic signal $\Delta H$ is therefore compared with a relatively large limit value K1. If the diagnostic signal $\Delta H$ exceeds the limit value K1, this means that during the observation period $t_{TEST}$ a large quantity of fuel has remained uncombusted and has filled up a combustion chamber, thereby posing the risk of dieseling. Dieseling of this kind occurs when the uncombusted fuel in a combustion chamber exceeds the clearance volume of said combustion chamber, as the incompressible fuel prevents the piston from reaching top dead center during the compression stroke. If the limit value K1 is exceeded, emergency shutdown of the internal combustion engine therefore occurs.

Otherwise, in a next step a check is performed to ascertain whether the diagnostic signal $\Delta H$ exceeds at least a second limit value K2<K1. If this is the case, a warning light is activated to indicate to the user that a fault is present.

If, on the other hand, the diagnostic signal $\Delta H$ is less than even the second limit value K2, another possibility is that the excess injected fuel could still be combusted. In this case the theoretically calculated enthalpy $H_{FUEL}$ is smaller than the actual value, so that the diagnostic signal $\Delta H$ is negative.

The diagnostic signal $\Delta H$ is therefore compared in a further step with a negative limit value K3, the internal combustion engine 1 being shut down immediately if the negative limit value is undershot.

Otherwise the diagnostic signal $\Delta H$ is compared with another negative limit value K4 whose absolute value is smaller than the absolute value of the limit value K3. If the diagnostic signal $\Delta H$ undershoots the limit value K4, a warning light is activated.

If, on the other hand, none of the above-described limit values K1-K4 is exceeded or undershot, it can be assumed that the theoretically calculated enthalpy $H_{FUEL}$ correctly reflects the actual value and therefore no fault is present.

The drive system shown in FIG. 1b is largely similar to the drive system shown in FIG. 1a, so that, in order to avoid repetitions, reference will be made to the above description and only the particular features of this exemplary embodiment will be explained below. In addition, the same reference characters are used for corresponding components in FIGS. 1b and 1a, an apostrophe being used solely for differentiation.

A special feature of this drive system is exhaust gas recirculation. Thus between the internal combustion engine 1' and the exhaust gas turbine 2', an exhaust gas recirculation duct 11 branches off which is connected to an exhaust gas recirculation valve 12 in the intake manifold of the internal combustion engine 1'. Depending on the setting of the exhaust gas recirculation valve 12, part of the exhaust gas can therefore be fed back into the intake manifold of the internal combustion engine 1', there being disposed in the exhaust gas recirculation duct 11 a cooler 13 which cools the recirculated exhaust gas with heat energy $Q_{COOL,EGR}$ being dissipated into the environment.

Another particular feature of this exemplary embodiment is a bypass pipe 14 enabling the intercooler 6' to be bypassed, there being disposed in the bypass pipe 14 a valve 15 which controls the secondary flow through the bypass pipe, while there is disposed in the main conduit a filter 16 which controls the main flow.

Finally there is disposed in the exhaust gas flow of the internal combustion engine 1' in this embodiment an exhaust gas catalytic converter 17 in order to clean the exhaust gas.

The method according to the invention shown in FIGS. 2a and 2b can likewise be used for the drive system depicted in FIG. 1b, only the different variables $H_{FRESH\_AIR}$ or $H_{FRESH\_AIR}'$, $W_{MECH,VERDICHTER}$, $H_{FUEL}$, $W_{MECH,ICE}$, $Q_{COOL,TURBINE}$, $Q_{COOL,EGR}$, $Q_{THERM}$, $W_{MECH,TURBINE}$, $H_{EXHAUST}$ or $H_{EXHAUST}'$ being calculated in accordance with suitably adapted formulae.

The invention is not limited to the preferred exemplary embodiments described above. Instead, a large number of variants and modifications are possible which likewise make use of the inventive idea and therefore fall within the scope of the invention.

I claim:

1. A method for monitoring an internal combustion engine having an injection system, in particular for preventing dieseling in the case of a diesel engine, comprising the following steps of:
   Establishing a theoretical calorific balance of the internal combustion engine, and
   Determining a diagnostic signal reflecting the disequilibrium of the theoretically determined calorific balance, said diagnostic signal indicating a malfunction in the injection system and/or the internal combustion engine.

2. The method according to claim 1, comprising the following steps of:
   Input-side determination of a calorific state variable of the internal combustion engine;
   Output-side determination of a calorific state variable of the internal combustion engine; and
   Taking into account of the two state variables in the calorific balance of the internal combustion engine to produce the diagnostic signal.

3. The method according to claim 2, wherein the state variable determined on the input side is the enthalpy supplied to the internal combustion engine by fuel and/or fresh air.

4. The method according to claim 1, wherein the state variable determined on the output side is the enthalpy removed from the internal combustion engine by the exhaust gas flow.

5. The method according to claim 1, wherein the mechanical work performed by the internal combustion engine is determined and taken into account in the calorific balance of the internal combustion engine to produce the diagnostic signal.

6. The method according to claim 1, wherein the thermal losses of the internal combustion engine are determined and taken into account in the calorific balance of the internal combustion engine to produce the diagnostic signal.

7. The method according to claim 1, comprising the following steps of:
   Determining the exhaust gas temperature;
   Determining the mass air flow; and
   Determining the enthalpy removed from the internal combustion engine from the exhaust gas temperature and the mass air flow.

8. The method according to claim 1, comprising the following steps of:
   Determining the exhaust gas temperature;
   Determining the RPM of the internal combustion engine; and
   Determining the enthalpy removed from the internal combustion engine from the exhaust gas temperature, the RPM of the internal combustion engine and the predefined cubic capacity of the internal combustion engine.

9. The method according to claim 1, comprising the following steps of:
   Determining the injection quantity; and
   Determining the enthalpy supplied to the internal combustion engine from the injection quantity.

10. The method according to claim 1, comprising the following steps of:
    Feeding back part of the exhaust gas flow of the internal combustion engine to the air intake of the internal combustion engine in accordance with a defined exhaust gas recirculation rate; and
    Determining the enthalpy supplied to the internal combustion engine as a function of the exhaust gas recirculation rate.

11. The method according to claim 1, comprising the following steps of:
    Comparing the diagnostic signal with a first limit value; and
    Emergency shutdown of the internal combustion engine and/or injection system if the first limit value is exceeded.

12. The method according to claim 1, comprising the following steps of:
    Comparing the diagnostic signal with a second limit value; and
    Activating a visual or audible warning signal if the second limit value is exceeded.

* * * * *